(12) United States Patent
Sun et al.

(10) Patent No.: US 9,367,829 B2
(45) Date of Patent: Jun. 14, 2016

(54) FILE STORAGE DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 7 days.

(21) Appl. No.: 14/448,341

(22) Filed: Jul. 31, 2014

(65) Prior Publication Data

US 2015/0034721 A1 Feb. 5, 2015

(30) Foreign Application Priority Data

Aug. 2, 2013 (CN) .......................... 2013 1 0333248

(51) Int. Cl.
*G06Q 10/08* (2012.01)
*G06K 7/10* (2006.01)

(52) U.S. Cl.
CPC .......... *G06Q 10/087* (2013.01); *G06K 7/10356* (2013.01); *G06K 7/10415* (2013.01)

(58) Field of Classification Search
USPC ....................... 235/385; 340/505, 572.1, 10.6
See application file for complete search history.

(56) References Cited

U.S. PATENT DOCUMENTS

| | | | | |
|---|---|---|---|---|
| 2004/0174257 | A1* | 9/2004 | Kuhns | G06K 19/02 340/508 |
| 2008/0042839 | A1* | 2/2008 | Grater | G01N 35/00732 340/572.1 |
| 2010/0103071 | A1* | 4/2010 | Farrell | H01Q 1/2225 343/853 |
| 2012/0001758 | A1* | 1/2012 | Zhu | G06Q 10/10 340/572.8 |
| 2014/0266621 | A1* | 9/2014 | Jones | G06K 7/10227 340/10.1 |

* cited by examiner

*Primary Examiner* — Allyson Trail
(74) *Attorney, Agent, or Firm* — Novak Druce Connolly Bove + Quigg LLP

(57) ABSTRACT

A file storage device stores files with radio frequency identification (RFID) tag attached. The file storage device includes a plurality of antennas and a circuit board. A plurality of interval boards are mounted in series, file-holding slots are therefore created between the interval boards. The antennas, connected to the circuit board, are mounted to the interval boards, each antenna corresponding to one slot. Each antenna can establish a wireless communication with the RFID tag of a file, each RFID tag feeding information as to itself to the corresponding antenna. The circuit board communicates wirelessly with an external terminal device for file location and searching purposes.

15 Claims, 2 Drawing Sheets

FILE STORAGE DEVICE

CROSS-REFERENCE TO RELATED APPLICATIONS

The present application is related to the co-pending U.S. patent application 14/446,578, entitled "FILE SEARCHING SYSTEM AND FILE SEARCHING METHOD THEREOF". This application has the same assignee as the present application and has been concurrently filed herewith. The above-identified application is incorporated herein by reference.

FIELD

The present disclosure relates to file storage devices, and particularly relates to a file storage device having radio frequency identification utility.

BACKGROUND

A company or an organization office needs to store a plurality of paper files. The paper files should be stored in an order convenient for searching. When a quantity of the paper files is large, searching efficiently for the right file becomes more important. Sometimes staff may also mis-store files.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
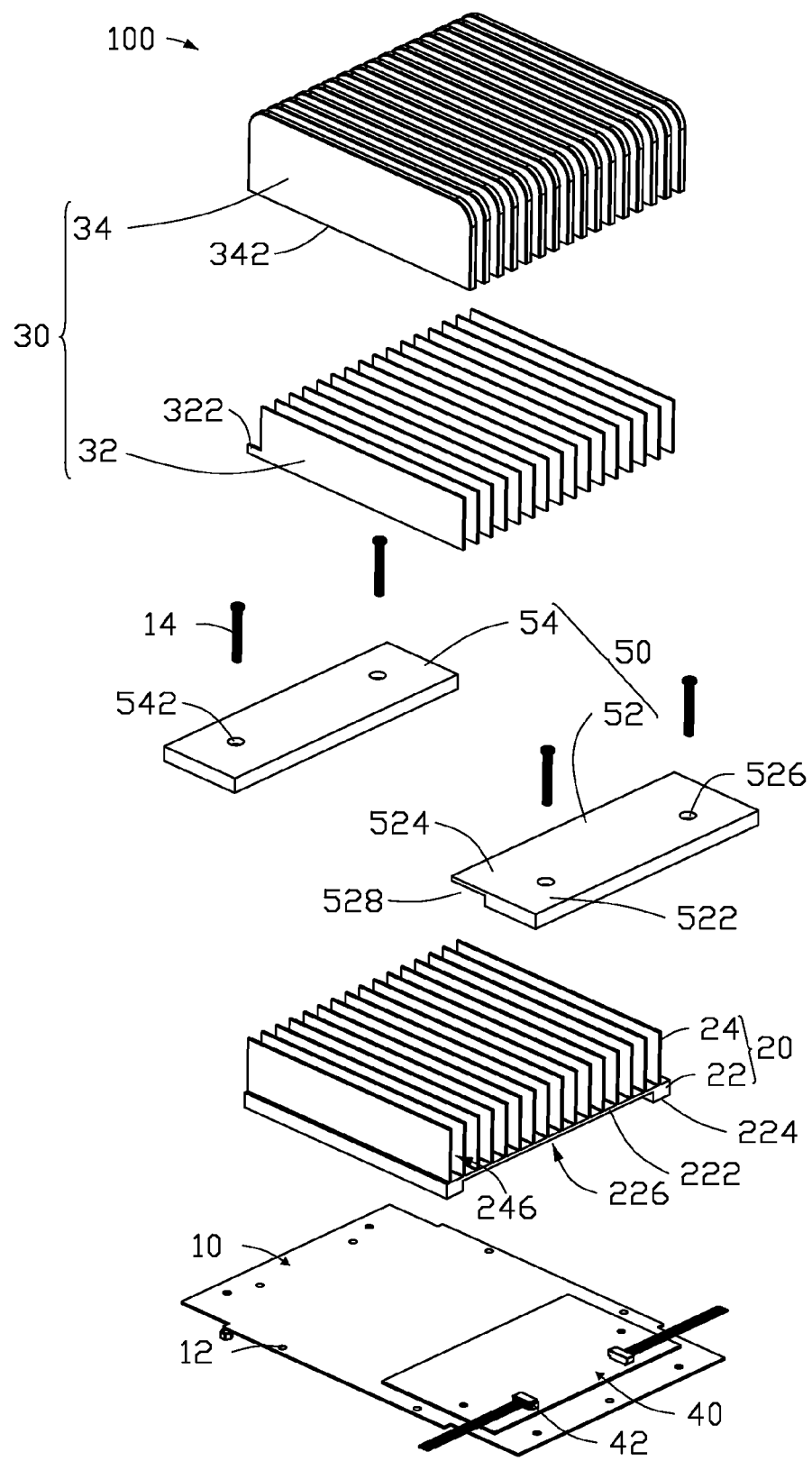
FIG. 1 is an exploded isometric view of an exemplary embodiment of a file storage device.

FIG. 1 illustrates an exemplary embodiment of a file storage device 100. The file storage device 100 is for storing a plurality of files with radio frequency identification (RFID) tags. The file storage device 100 includes a bottom board 10, a pedestal 20, an antenna assembly 30, a circuit board 40, and a cover assembly 50.

The bottom board 10 defines a plurality of mounting holes 12 for mounting the pedestal 20. The file storage device 100 further includes a plurality of posts 14 for coupling the cover assembly 50 to the bottom board 10.

The pedestal 20 includes a base 22 and a plurality of interval boards 24. The base 22 includes a base board 222 and two supporting blocks 224. The two supporting blocks 224 are mounted on opposite edges of a bottom surface of the base board 222 for supporting the base board 222. The interval boards 24 are perpendicularly arranged on an upper surface of the base board 222. The interval boards 24 are evenly spaced from each other and are arranged in series, thereby forming a plurality of slots 246 between every two adjacent interval boards 24. The slots 246 may receive the files. In an exemplary embodiment, the pedestal 20 is made of metal, such as aluminum.

The antenna assembly 30 includes a plurality of antennas 32 and a plurality of housings 34 corresponding to the antennas 32. Each housing 34 defines an opening 342 on one end. In an exemplary embodiment, the housing 34 is substantially frame-shaped and has a similar size to the interval board 24. The antennas 32 are coupled to interval boards 24 and each antenna 32 corresponds to one slot 246. Each housing 34 receives one interval board 24 with one antenna 32, thereby protecting the antenna 32. In an exemplary embodiment, the antenna 32 can be pasted to a side surface of the interval board 24 by an adhesive. A working frequency of the antenna 32 can be, for example, about 915 megaHertz (MHz). The working frequency of the antenna 32 can be adjusted to be applied to receive signals from the RFID tags of the files and transmit the signals to an external device. Furthermore, each antenna 32 includes a connecting portion 322 on one end for electronically connecting the antenna 32 to the circuit board 40.

The circuit board 40 includes several electronic components that realize circuit functions for the file storage device 100. The circuit board 40 includes two connectors 42 for electronically connecting to other file storage devices 100, thereby forming compartments of a cabinet for storing a large number of files. When several file storage devices 100 are in serial connection, the connectors 42 of the opposite sides are electronically connected to external processors and exchange data.

The cover assembly 50 includes a first cover 52 and a second cover 54. The first cover 52 includes a main portion 522 and an extending portion 524 extending from an end of the main portion 522. The extending portion 524 has a lesser thickness than that of the main portion 522. The first cover 52 defines two first fixing holes 526 for engaging with the posts 14 to couple the first cover 52 to the bottom board 10. The second cover 54 defines two second fixing holes 542 for engaging with the posts 14 to couple the second cover 54 to the bottom board 10.

Figure 2:
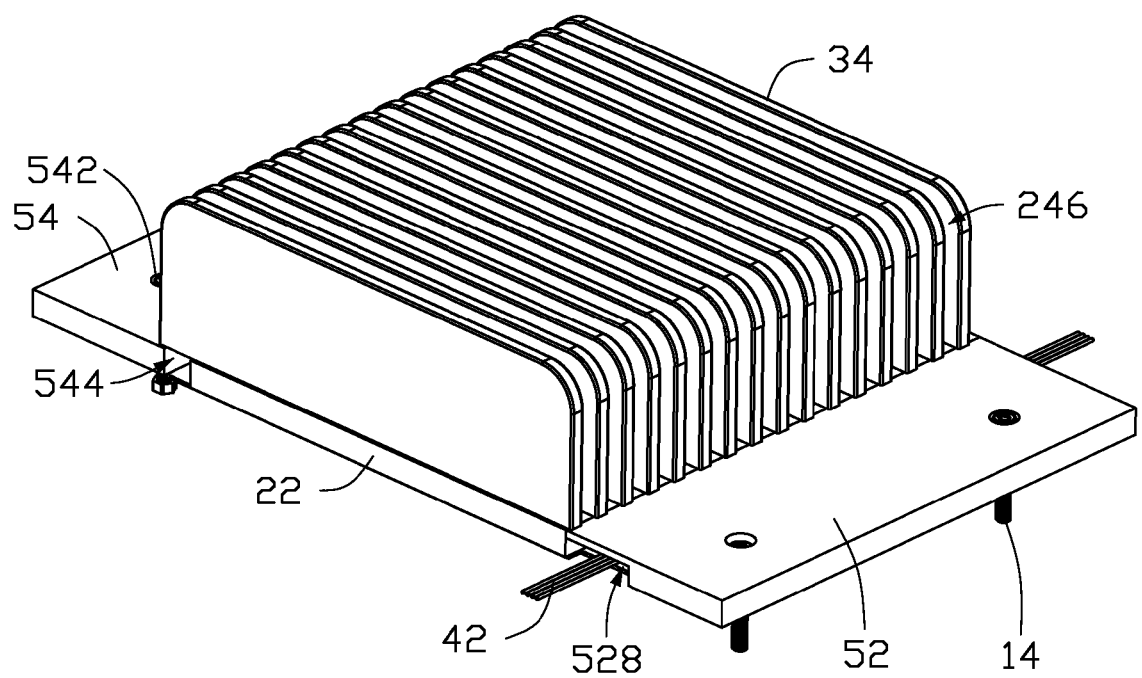
FIG. 2 is an isometric view of the assembled file storage device of FIG. 1.

FIG. 2 illustrates the file storage device 100 in assembled state. When assembling the file storage device 100, the supporting blocks 224 are mounted on the bottom board 10, supporting the interval boards 24 thereon. The two supporting blocks 224, the base board 222, and the bottom board 10 enclose a receiving space 226. The circuit board 40 is mounted on the bottom board 10 and has an end portion received in the receiving space 226. The antennas 32 are coupled to the interval boards 24 and each antenna 32 corresponds to one slot 246. The housings 34 receive the interval boards 24 and the antennas 32. The first cover 52 covers the circuit board 40 with the extending portion 524 resting on the base 22. The posts 14 are inserted through the bottom board 10 and the first fixing holes 526, to couple the first cover 52 to the bottom board 10. The extending portion 524, a side of the main portion 522, the base 22, and the bottom board 10 enclose a channel 528, the connectors 42 are exposed from the channel 528, thereby allowing electrical connection to other file storage devices 100 or to external processors (not shown). The second cover 54 covers the bottom board 10 being adjacent to but spaced from the base 22 opposite to the first cover 52. The second cover 54 and the base form a path 544 therebetween and the connecting ends 322 of the antennas 32 are exposed from the path 544, thereby the connecting ends 322 can be electrically connected to the circuit board 40. The posts 14 are inserted through the bottom board 10 and the second fixing holes 526, coupling the second cover 54 to the bottom board 10. The base board 222, the first cover 52, and the second cover 54 are in one plane, the first cover 52 and the second cover 54 are on opposite sides of the base board 222.

The slots 246 receive files with their RFID tags, each slot 246 receiving one file. Each antenna 32 can establish a wireless communication with an RFID tag of the file in the corresponding slot 246, when polled the RFID tag feeds information back to the antenna 32. The antennas 32 transmit information as to the particular RFID tags which have indicated their presence to an external terminal device for storing the information in the external terminal device. When the external terminal device broadcasts a searching signal, the relevant antenna 32 receives the searching signal and indicates the searched-for RFID tag, for example, by lighting an indication lamp corresponding to the antenna 32.

In an exemplary embodiment, the metal interval boards 24 can shield against electromagnetic interference from neighboring antennas 32.

The true location of a particular file can be discovered very quickly, and all the files received in the file storage device 100 can report themselves as required, saving time and overcoming mistakes.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A file storage device for storing files having radio frequency identification (RFID) tags, the file storage device comprising:
    a plurality of interval boards spaced in series, a file holding slot formed between each consecutive interval board;
    a plurality of antennas mounted to the interval boards, each antenna corresponding to one file holding slot; and
    a cover assembly, wherein the cover assembly comprises a first cover and a second cover, the first cover comprises a main portion and an extending portion extended from one end of the main portion, the extending portion has a smaller thickness than the main portion;
    wherein each of the plurality of antennas is configured to receive wireless communication signal from a RFID tag of a storage file received in the corresponding file holding slot.

2. The file storage device as claimed in claim 1, wherein each of the plurality of antenna established wireless communication with the RFID tag of the storage file in the corresponding file holding slot.

3. The file storage device as claimed in claim 1, wherein each of the plurality of antennas wirelessly receives self-identifying information from the RFID tag of the storage file in the corresponding file holding slot.

4. The file storage device as claimed in claim 3, wherein the each of the plurality of antenna transmits the received self-identifying information to an external terminal for identifying the location of the storage files.

5. The file storage device as claimed in claim 1, wherein the RFID tag of the storage file in the holding slot transmits self-identifying information to the antenna corresponding to the holding slot.

6. The file storage device as claimed in claim 1, wherein each antenna comprises a connecting portion extended from one end, the connecting end is electrically connected to a circuit board.

7. The file storage device as claimed in claim 6, further comprising a base, wherein the base comprises a base board and two supporting blocks mounted on opposite edges of the base board, the interval boards are mounted on the base board.

8. The file storage device as claimed in claim 7, wherein the interval boards and the base are made of metal material.

9. The file storage device as claimed in claim 8, further comprising a bottom board, wherein the supporting blocks are mounted on the bottom board and support the base board and the interval boards thereon, the supporting blocks, the base board, and the bottom board enclose a receiving space.

10. The file storage device as claimed in claim 9, wherein the circuit board comprises several connectors, the connectors electronically connected to other file storage devices to form a cabinet for storing a large number of files.

11. The file storage device as claimed in claim 10, wherein the circuit board is arranged on the bottom board with an end portion received in the receiving space, the first cover covers on the circuit board, the extending portion, a side of the main portion, and the bottom board enclose a channel, the connectors are exposed from the channel.

12. The file storage device as claimed in claim 11, wherein the second cover covers on the circuit board and adjacent to but spaced apart from the receiving space, the second cover and the base form a path therebetween, the connecting ends of the antennas are exposed from the path.

13. The file storage device as claimed in claim 12, further comprising a plurality of posts, wherein the first cover and the second cover define a plurality of fixing holes therethrough, the posts are inserted through the bottom board and the corresponding holes to fix the first cover and the second cover on the bottom board.

14. The file storage device as claimed in claim 13, wherein the base board, the first cover, and the second cover are in one plane, the first cover and the second cover are on opposite sides of the base board.

15. The file storage device as claimed in claim 1, further comprising a plurality of housings, wherein each of the housings receives one interval board with one antenna.

* * * * *